Aug. 27, 1940.  J. N. SHARMA  2,212,621
PROCESS FOR TREATING FRUITS
Filed May 31, 1939  3 Sheets-Sheet 3
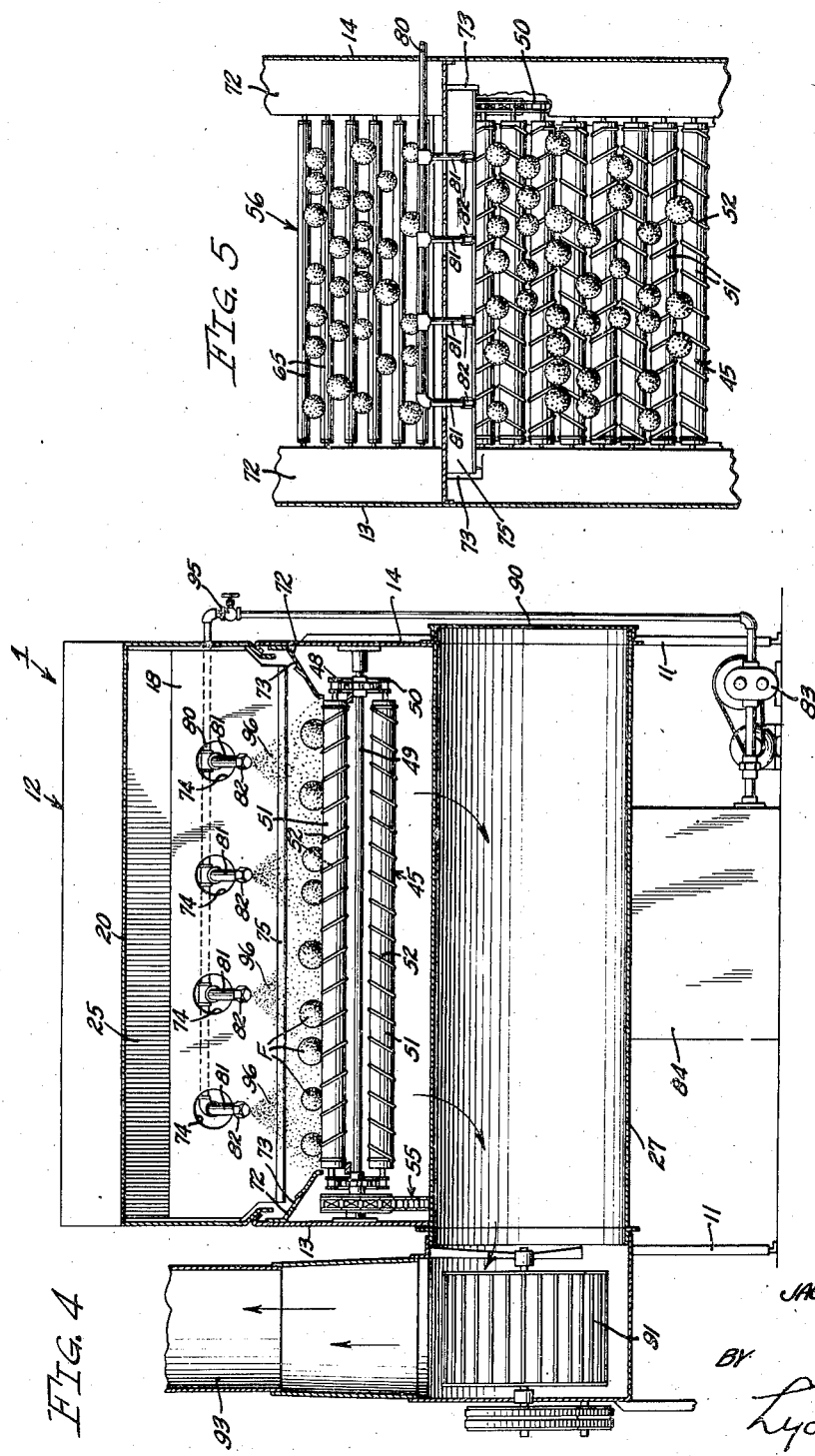
INVENTOR
JAGAN N. SHARMA
ATTORNEYS Patented Aug. 27, 1940

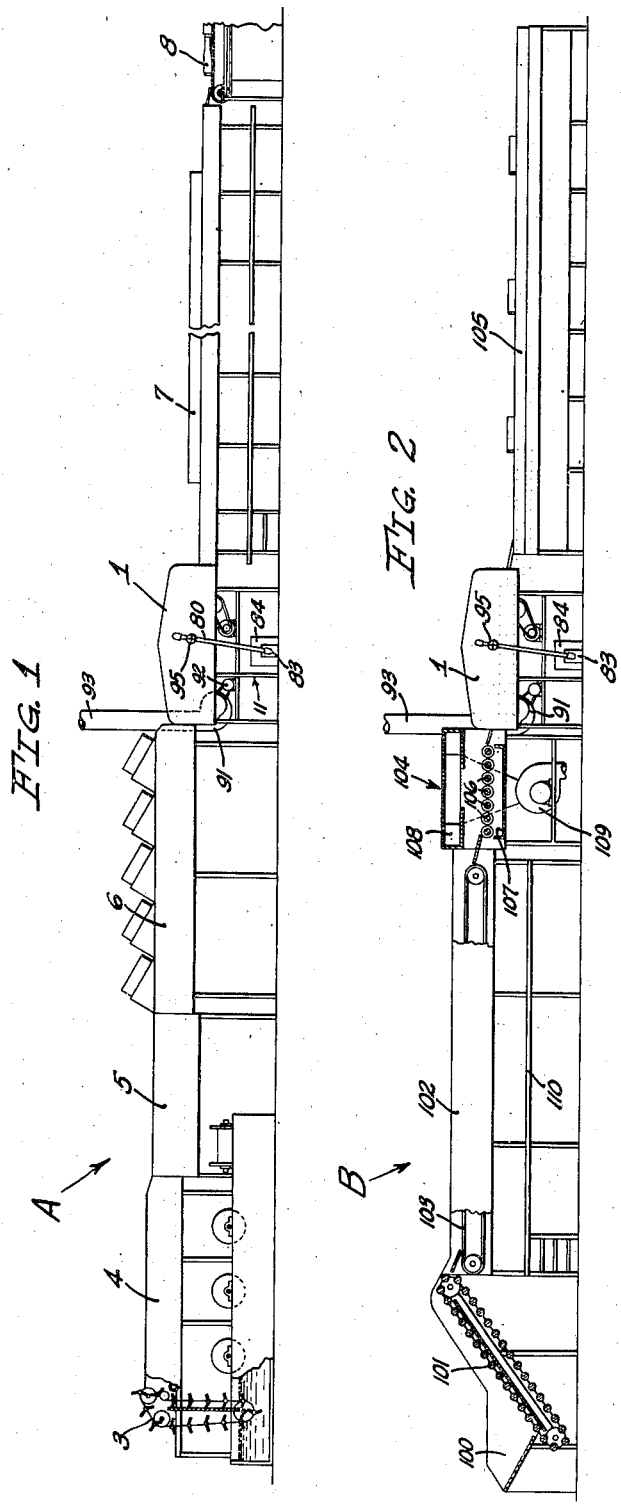

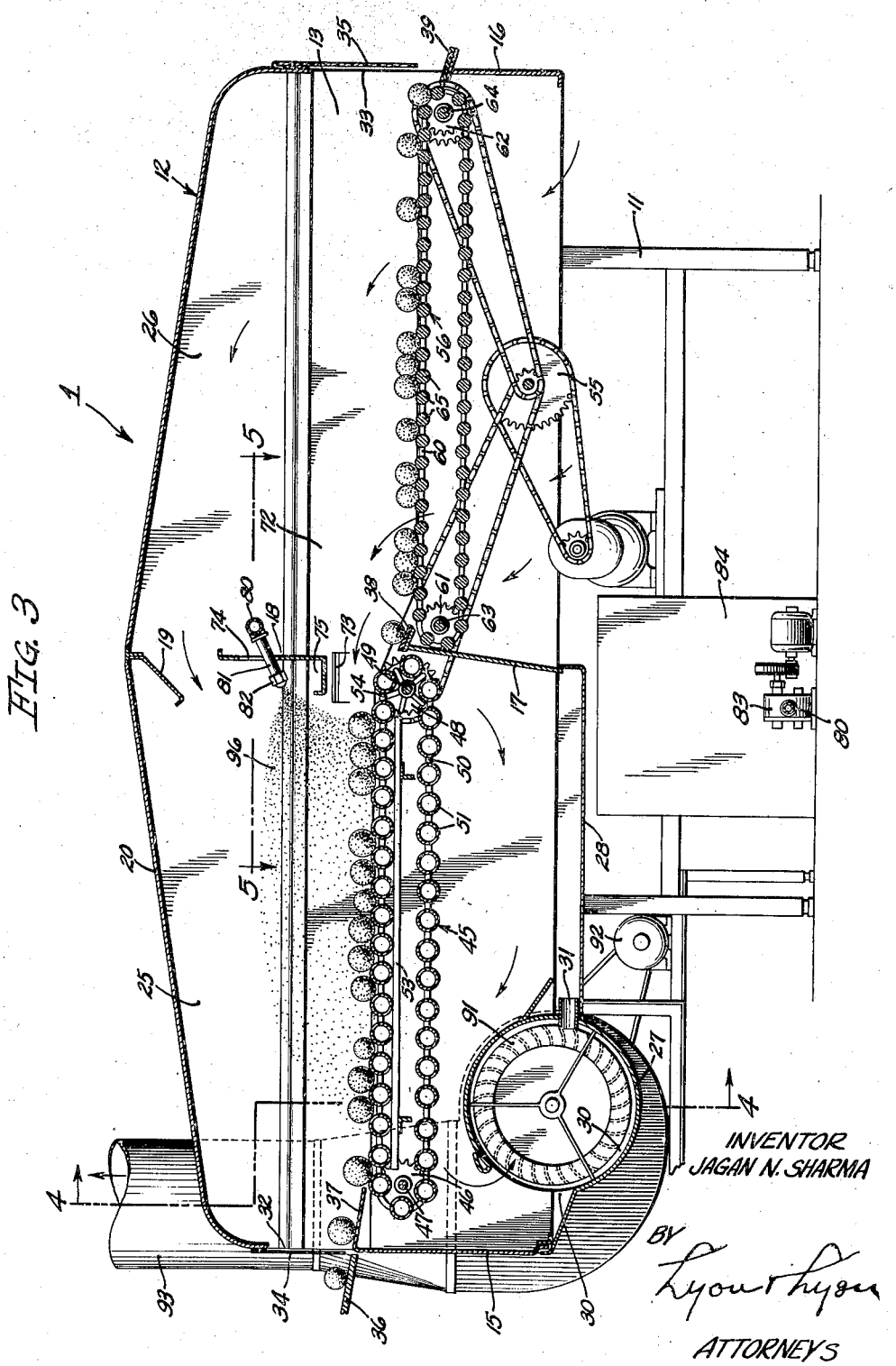

2,212,621

UNITED STATES PATENT OFFICE 2,212,621

PROCESS FOR TREATING FRUITS

Jagan N. Sharma, Los Angeles, Calif., assignor to Food Machinery Corporation, San Jose, Calif., a corporation of Delaware Application May 31, 1939, Serial No. 276,599

14 Claims. (Cl. 99—168)

This invention relates to a process for treating fresh fruits for the purpose of enhancing their appearance and for retarding their rate of shrinkage during marketing.

In order to market certain fruits, it has been the practice to apply waxy materials to the same to retard their rate of shrinkage. In the marketing of citrus fruit, for example, it is generally found necessary to wash from the fruit, before the latter is displayed for sale, the dust and scale which the fruit accumulates in the groves. The process of thus cleaning the fruit lessens its resistance to shrinkage. Waxy material has been applied to such citrus fruit for the purpose of retarding the shrinkage and to improve the appearance of the fruit.

It is the general object of the present invention to provide an improved process and apparatus for applying waxy material to fruit.

By means of the process and apparatus of the present invention, the waxy material which is to be applied to the fruit is dissolved in a volatile solvent and then sprayed upon the fruit. A volatile solvent is employed of the kind which will readily evaporate from the fruit at atmospheric temperature. The use of solvents of too high boiling point, such for example as kerosene, is to be avoided since the use of such high boiling point or non-volatile solvents is detrimental to the surface of the fruit. The solvent employed should be sufficiently volatile as to be evaporated from the fruit in the process before its cutting action on the skin can result in the skin of the fruit being substantially deteriorated. Only sufficient of the waxy material should be added to the solvent so that the solvent is capable of entirely dissolving the waxy material. In case so much of the waxy material is added to the solvent as to form a solid phase mixture of solvent and undissolved waxy material, it is difficult to secure the desired fine spray which it is desired to apply to the fruit to be treated.

In the process the solution of waxy material and volatile solvent is finely atomized and directed positively against the surface of the fruit to be coated. In such operation the spray of waxy material and solvent should be uniformly applied to the surface of the fruit. For this purpose, it is preferable that the fruit be rolled or turned during the spraying operation.

The solution should be sprayed onto the fruit under regulated quantities and conditions to avoid the presence of such quantity of solvent on the fruit as to damage the skin thereof. The application of the solution to the fruit in sufficient quantity to cause the solution to drip from the fruit leaches the natural waxes and oils from the fruit and results in the fruit being "burned".

Contrary to the usual practice in the art, in the process and apparatus of the present invention the waxy material after being deposited with the volatile solvent upon the fruit by the spray is preferably left as so deposited until the evaporation of the solvent; that is to say, the waxy material or solution of waxy material and solvent should not be spread over the fruit, as for example by brushing, while the waxy material is still damp or softened by the solvent. I have discovered that brushing of the waxy material while the same is still damp or softened by the solvent tends to decrease the beneficial results of the process. For illustration, when California citrus fruit is brushed during the spraying operation, or subsequent thereto and before evaporation of the solvent, it will be found that the skin of the fruit is hardened. Apparently, the brushing of citrus fruit in the presence of the solvent due to the abrasion of the brushes and cutting action of the solvent deteriorates the outer skin of the fruit so that upon standing the oil and moisture evaporate from the rind and the skin develops a hardened appearance.

I have further discovered that brushing of citrus fruit during the spraying operation inhibits the waxy material from properly controlling the shrinkage rate of the fruit. This is apparently due to the fact that the abrasion of the brushes in combination with the cutting action of the solvent so deteriorates the outer skin of the fruit that the rate of shrinkage of the fruit increases.

I have further discovered that the brushing of citrus fruit during the spraying of the waxy material and solvent on the fruit interferes with the enhancement of the appearance of the fruit.

It is the discovery of the present invention that where the waxy material and solvent are sprayed upon citrus fruit and the solvent permitted to evaporate without brushing the fruit, an enhancement or improvement in the polish of the fruit is attained, whereas if the fruit is brushed during such operation the fruit develops a dull appearance.

The process and apparatus of the present invention is designed to apply a limited quantity only of the waxy material to the fruit to be treated. I have discovered that by the process of the present invention the desired improvement in appearance of the fruit and the proper control of the shrinkage rate may be effected by application to the fruit of a very minute quantity of the waxy material. The amount of waxy material to be applied to the fruit for a given shrinkage control is in the process of the present invention much less, in some cases ¼ or ⅓ of the wax commonly used in other processes with the same shrinkage control.

The exact mechanism by which the process and apparatus of the present invention produces the same or better degree of shrinkage control as other processes using a much larger amount of wax is not fully understood. One suggestion is that this minute quantity of wax is carried into the structure of the peel by the solvent. Another suggestion is that the very short time that the solution is in contact with the outer surface of the fruit before the solvent has entirely evaporated prevents any substantial penetration of the peel, but that the solvent does dissolve a portion of the natural wax comprising the outer cuticle of the peel and binds together the particles of that natural wax so as to greatly increase the preservative character of the latter without greatly adding to the mass of the natural wax. Another suggestion is that the slight amount of the highly volatile solvent applied to the peel stimulates the wax glands of the peel, causing an abnormal activity of these glands during the period immediately following the treatment of the fruit so as to build up a substantially thicker coating of natural wax than would otherwise be formed on the fruit by these glands as the fruit ages. Another suggestion is that the atomized particles of the solution carrying the waxy material apply the waxy material in spots, and that while the spaces between these spots may have a small amount of wax spread thereover these spaces are substantially free to permit breathing of the fruit through this layer of applied wax of infinitesimal thickness while the wax in the spots is of sufficient thickness to retard evaporation from the fruit to a point where a commercially desirable degree of shrinkage control is effected.

While any one or all of the above suggestions and theories may have good basis in fact, I do not rely on the correctness of any of such suggestions and theories.

The process and apparatus of the present invention, together with various additional objects and advantages thereof, will best be understood from a description of a preferred form or forms of the process and apparatus embodying the invention, and for this purpose I have hereinafter described in connection with the accompanying drawings a preferred form or forms of the process and apparatus of the present invention.

Referring to the drawings:

Figure 1 is a diagrammatic side elevational view illustrating the form of apparatus especially adapted for the treatment of citrus fruit.

Figure 2 is a diagrammatic side elevational view illustrating the form of apparatus especially adapted for the treatment of cantaloupes.

Figure 3 is an enlarged longitudinal sectional view of a portion of the apparatus which is common to Figures 1 and 2.

Figure 4 is a sectional view taken on the line 4—4 of Figure 3.

Figure 5 is a fragmentary sectional view taken on the line 5—5 of Figure 3.

Referring to the drawings, and particularly to Figure 1, the apparatus is illustrated as comprising a soaking tank 2, from which the fruit to be treated is passed by a loose fruit elevator 3 through a washer 4, water eliminator 5, and drier 6 to the waxer 1. From the waxer 1 the fruit is passed to a sorting table 7 and sizer 8.

Aside from the particular form of waxer 1, the remainder of the equipment may be of any usual or preferred form used in the art for the purpose of washing and drying the fruit previous to the waxing operations or for the purpose of sorting and sizing the fruit after the waxing operations. In the marketing of citrus fruit, it is generally found necessary to first wash from the fruit the dust and scale which the fruit accumulates in the groves. This washing and cleaning of the fruit somewhat lessens its resistance to shrinkage and to an extent also dulls the appearance of the fruit. The appearance of the fruit is to some degree restored by the action of the usual brushes (not shown) in the drier 6 of the apparatus, but the fruit leaving such washing and drying apparatus is particularly adapted to treatment by the process and apparatus of the present invention for the enhancement of its appearance and improvement of its shrinkage rate.

The waxer 1 includes a frame 11 supporting a housing 12, the latter having side walls 13 and 14, end walls 15 and 16, and an intermediate partition 17. The housing 12 also includes a partition 18 and draft deflecting wall 19, which are disposed directly above the partition 17 and joined at their opposite ends with the walls 13 and 14. The housing 12 also includes a roof 20.

The space within the housing is divided into two chambers 25 and 26 by the partitions 17 and 18 and the baffle wall 19. Connecting with the lower edges of the walls 13, 14, and 15 is a substantially cylindrical air conduit 27, this conduit uniting with a pan 28 to cover the bottom of chamber 25. The conduit 27 has a mouth 30 for admitting air into the conduit from the lower left hand corner of the chamber 25, as shown in Figure 3. For a purpose which will be made clear hereinafter, the pan 28 is connected with the interior of the conduit 27 by a short pipe 31.

The end walls 15 and 16 are provided with inlet and outlet openings 32 and 33, which are preferably covered with flexible drapes 34 and 35. Fruit is adapted to be fed past the drape 34 and through the inlet opening 32 from a runway 36, this fruit passing onto a runway 37 formed on the wall 15. The upper edge of partition 17 is provided with a drop board 38 and the wall 16 along the lower edge of the discharge opening 33 has a drop board 39.

Supported between the side walls 13 and 14 in the chamber 25, so as to divide this into upper and lower portions, is a waxing conveyor 45. This conveyor receives fruit from the runway 37 and delivers it onto the drop board 38. The conveyor 45 includes sprockets 46 on a shaft 47 and sprockets 48 on a shaft 49, these shafts journaling in suitable bearings provided on the sidewalls. Trained about these sprockets are endless chains 50. Suspended at their opposite ends from these chains is an endless series of freely rotatable rollers 51. As shown in Figures 4 and 5, each of these rollers is provided with a thread 52 formed by a piece of strip material coiled about the roller and secured thereto, these threads in adjacent rollers being pitched in opposite directions. The rollers 51 in the upper flight of the conveyor 45 are supported at their opposite ends upon stationary tracks 53 so as to cause the rollers resting thereon to rotate.

Surrounding the shaft 49 is a spider 54 for dislodging fruit from valleys between adjacent rollers 51 as these rollers travel about the shaft 49. The sprockets 48 are fixed upon the shaft 49 and the latter is driven by a sprocket and chain connection with a suitable power mechanism 55 provided on the frame 11.

Disposed within the chamber 26 so as to receive fruit from the drop board 38 and deliver it onto the drop board 39 is a drying conveyor 56, this conveyor including endless chains 60 trained about pairs of sprockets 61 and 62 mounted on shafts 63 and 64. Supported at their opposite ends by the chains 60 is an endless series of cross bars 65. The conveyor 56 is continuously driven by a suitable sprocket and chain connection between the shaft 64 and the power mechanism 55.

Mounted on the inner faces of the side walls 13 and 14 and sloping downwardly into proximity with the edges of the conveyors 45 and 56 are fruit guard aprons 72. Just below the partition 18 these guards have drip openings 73.

The partition 18 has a series of openings 74 provided therein, there being four of these in the preferred embodiment shown. The lower edge of this partition is bent to form a drip trough 75, the opposite ends of which are positioned to discharge drippings collected in this trough downwardly through the openings 73 in the guards 72.

Extending along the partition 18 in the chamber 26 is a liquid wax vehicle supply pipe 80 from which nipples 81 extend through the holes 74. These nipples are provided on their inner ends with atomizing nozzles 82. As shown in Figs. 3 and 4, the nipples 81 are preferably inclined downwardly from horizontal. The supply pipe 80 is connected with a pump 83 which draws a liquid vehicle containing a very small quantity of wax in finely divided condition from a tank 84 and constantly forces this liquid into the pipe 80 so as to provide a constant supply of said liquid to the nozzles 82 at a predetermined pressure.

The conduit 27 is open at opposite ends and is adapted to be closed at either of these ends by a cap 90. At its other end the conduit 27 connects with a rotary blower 91, which is driven by an electric motor 92 causing it to withdraw air from the conduit 27 and discharge this upwardly through a stack 93.

The operation of the process and apparatus of the present invention as carried out in the above apparatus is as follows:

The tank 84 is furnished with a supply of the solution of waxy material. The process and apparatus may employ any one or more of a wide variety of waxy materials. I prefer to employ paraffine, which may be used in various grades and different melting points. Other waxy materials which may be utilized in the process and apparatus of the present invention include, among others, beeswax, ozocerite, and hydrogenated edible oils. Where the process and apparatus is to be employed in the treatment of fruits and vegetables whose skin is to be eaten, it may be preferable to employ a hydrogenated edible oil, such for example as those described in my copending application, Serial No. 77,548. Various volatile solvents may be employed, including petroleum solvents, such as lacquer diluents, rubber solvent, and refined petroleum distillates, alcohols, and ethers, such as isopropyl ether or isopropyl alcohol. The essential characteristic of the solvent employed is that it should be sufficiently volatile to evaporate readily in the process. For example in the application of the process to the treatment of citrus fruit I have in some cases employed a rubber solvent having a boiling point range of 140–160° F. In other cases, I have employed a solvent having a boiling point range of 100–210° F. In other cases, I have employed a lacquer solvent having a boiling point range of 160–270° F., and in another instance a lacquer solvent having a boiling point range of 190–350° F.

Generally, for the treatment of citrus fruit in particular, the end boiling point of the volatile solvent employed should be below about 350° F., and I prefer to employ solvents the boiling point ranges of which are between 140–350° F., or at least 90 to 95% of the solvent should have a boiling point below 350° F. It is to be understood, however, that the addition of a minor percentage of high boiling point constituents to the solvents will not interfere with the process of the present invention, provided sufficient of the high boiling point material is not present to prevent the proper evaporation of the solvent.

The waxy material should be substantially completely dissolved in the volatile solvent, so as to avoid clogging the nozzles. Generally speaking, the amount of wax which can be held in solution varies with the temperature of the solution. In cases of extremely high atmospheric temperature, using petroleum solvents as above described, the solvent may dissolve as high as 10% or more of wax. In commercial operation I prefer to use only about 7% of wax in the solvent.

After supplying the tank 84 with the proper solution of waxy material the pump 83 is set in operation so as to maintain a hydraulic pressure of solution against the valve 95, which is closed. This pressure may vary anywhere from 30 to 125 pounds per square inch with the types of hydraulic atomizing nozzles available for use. The power mechanism 55 and the motor 92 are set in operation so as to cause the upper flights of the conveyors 45 and 56 to travel continuously from the receiving end towards the discharge end of the waxer 1. The other units of apparatus A are set in operation at the same time and fruit is dumped into the right-hand end of the soaking tank 2 in a continuous stream, this fruit thereafter flowing through the line of apparatus A in which it is washed in the washer 4, partially dried in the water eliminator 5, completely dried in the drier 6, waxed in the waxer 1, sorted as to surface characteristics while traveling over the conveyors of the sorting table 7, and finally sized by the sizer 8. Suitable bins under the sizer 8 catch the fruit as these are segregated and the fruit is taken manually from these bins, wrapped and packed in shipping cases.

When the stream of fruit through the apparatus A reaches the waxer 1, the valve 95 is turned on so as to permit the solution from the tank 84 to be delivered by the pump 83 to the atomizing nozzles 82. From these nozzles the wax solution is delivered in a very fine mist 96 which impinges against the layer of fruit F being carried forwardly over the conveyor 45. The blower 91 which is driven by the motor 92 constantly maintains a strong draft of air by sucking air into the mouth 30 of the conduit 27 and discharging this air upwardly through the stack 93. The draft set up by this suction enters the housing 12 from beneath the conveyor 56, and after passing upwardly through this conveyor and the chamber 26 it comes through the various apertures in the transverse plane of the nozzles 82 and carries the mist 96 downwardly with it so that the particles of this mist all have to pass in close proximity to the fruit F, with the inevitable result that by far the greater portion of these particles contact and adhere to this fruit. A certain portion of these particles, of course, are carried downwardly through the conveyor 45 and are exhausted by the blower through the stack 93.

The current of air produced by the blower 91 performs the triple function of accelerating the evaporation of the solvent from the surfaces of the fruit in the chamber 26, of forcibly impinging the mist 96 onto the fruit on the conveyor 45, and of expediting evaporation of the solvent from the mist particles as they travel toward the fruit. Incidentally, this current of air discharges the fumes of solvent produced in the process so as not only to facilitate the ready evaporation of the solvent from the mist particles as these hit the fruit, but at the same time eliminates the possibility of an inflammable gaseous mixture developing.

As the fruit F travels on the conveyor 45 it is not only rotated on its transverse axis by its contact with the cylindrical surfaces of the rollers 51, but the fruit is twisted periodically in this travel by the helical ribs 52, which turn the fruit to change the axis about which it is rotated by the rollers 51. Thus, practically all surfaces of all the pieces of fruit are subjected to the action of the atomized wax solution and receive a uniform application of the solution thereto.

Arriving at the end of the conveyor 45, the fruit is discharged over the drop board 38 onto the conveyor 56 which carries it through the draft of air rising upwardly in the chamber 26, so that the fruit is discharged from the right hand end of the conveyor 56 over the drop board 39 onto the receiving end of the sorting table 7. Thus, immediately after treatment by the process of this invention the fruit is ready for sorting and then sizing, after which it is, of course, packed in boxes as aforesaid.

The process and apparatus of the present invention should be so operated that the fruit passing through the waxer 1 has deposited thereon only the desired quantity of the solution of waxy material in the volatile solvent. In no case should the process be so operated as to apply sufficient of the waxy solution and volatile solvent to the fruit as to cause dripping. The placing of an amount of waxy solution on the fruit which is just less than sufficient to cause the solution to drip from the fruit is the maximum amount which the fruit will stand without its being both burned by the solvent and smothered by the heaviness of the wax coating which is left on the fruit when the solvent evaporates from the solution. However, generally the process is so operated as to apply materially less of the wax solution to the fruit than that corresponding to the point at which the solvent commences to drip from the fruit.

While the amounts of wax applied to individual pieces of fruit by the process and apparatus of the present invention may vary considerably in use, this amount of wax is in all cases very small as compared with the amounts of wax or waxy material applied to the fruit by other methods to secure the same amount of shrinkage control. For instance, by the use of the particular apparatus described, the maximum amount of wax which I have applied in commercial operation to a piece of citrus fruit of average size is approximately 1 to 15 milligrams of wax, and generally in the neighborhood of 6 milligrams of wax.

I have found that by the process and apparatus of the present invention the waxy material is so deposited on the citrus fruit as to reduce the shrinkage of the fruit to from about 35 to 60% of the shrinkage which such fruit would undergo if marketed without any protective application of waxy material. This corresponds to practically the maximum retardation of shrinkage that is useful, as any further attempt to retard the shrinkage of the fruit normally results in smothering of the fruit. By the process of the present invention, I not only secure the desired retardation of the shrinkage of the fruit but the fruit leaving the waxing operation or upon final evaporation of the solvent thereon possesses an enhanced appearance or increased polish.

The process of my invention may with advantage be used on various fruits in addition to citrus fruits, such as pears, apples, persimmons, green tomatoes, green peppers, potatoes, carrots, turnips, green peas, watermelons, honeydews, casabas, pecans, and walnuts. I have also found the process and apparatus of the present invention to be particularly valuable for the treatment of cantaloupes.

In Figure 2, I have illustrated an apparatus B especially adapted for the treatment of cantaloupes. In Figure 2, the waxer 1 may be in all respects identical with the waxer 1 employed in the apparatus of Figure 1 of the drawings. The apparatus of Figure 2 comprises a dumping hopper 100, a trash eliminating elevator 101, a sorting table 102 having a horizontal conveyor belt 103, a dry brusher 104, the waxer 1, and a long packing bin 105 which is provided with a suitable conveyor belt and distributing system for distributing cantaloupes throughout its length, as the latter are received from the waxer 1.

The dry brusher 104 has a series of cylindrical brushes 106 which are rapidly rotated at a speed preferably from 100 to 250 R. P. M., so that their upper surfaces travel in a direction from the receiving towards the discharge end of the brusher. Mounted beneath the brushes 106 is a dirt catching tray 107, while directly above these brushes is a hood 108 from which air is exhausted by a power driven blower 109.

In the operation of the process and apparatus of my inventon on cantaloupes with the apparatus shown in Figure 2, the cantaloupes are dumped from the crates in which they come from the field into the hopper 100, from which they are elevated by the elevator 101 onto the sorting belt 103. As the melons are carried on this belt, the culls are picked therefrom by workers who stand on a platform 110. The cantaloupes left on the belt 103 are those which come up to shipping standards. These pass into the brusher 104 and are vigorously brushed by the rotating brushes 106 so as to remove dirt adhering to the melons and scrub from the net of the melons the dead matter adhering thereto, as well as to clean out the fuzz-like hairs which grow in the valleys between the net. This leaves the outer surfaces of the cantaloupes brushed clean in readiness for waxing.

The application of the waxy material to the cantaloupes in the waxer 1 is carried out in exactly the same manner and may be carried out by exactly the same character of solvents and waxy material as is described in connection with the treatment of citrus fruit.

The cantaloupes are delivered from the waxer 1 onto the distributing belt of the bin 105 with the surfaces of the cantaloupes waxed but dry and ready to be wrapped and packed in shipping cases.

The process and apparatus of the present invention has the advantage of quickly applying the desired waxy material to the fruit to be treated and dispenses with the necessity of employing other than atmospheric temperatures, and results in a better control of the shrinkage rate and eliminates any injury to the fruit through its operation.

This application is a continuation in part of Serial No. 133,906, filed March 30, 1937.

While the particular process and apparatus herein described is well adapted to carry out the objects of the present invention, it is to be understood that various modifications and changes may be made and the process and apparatus include all such changes and modifications as come within the scope of the appended claims.

I claim:

1. A method of treating fresh fruit, which comprises producing an atmosphere with a mixture of air and a volatile organic solvent containing a wax dissolved therein, forcibly contacting the surface of the fruit with such atmosphere sufficiently to deposit waxy material thereon without wetting the surface of the fruit with the solvent to the extent that it will produce burning of the fruit.

2. A process of treating fruit, comprising forming a solution of waxy material in a volatile organic solvent distilling mainly below about 350° F., then atomizing said solution and causing the atomized particles to impinge against the surface of the fruit under conditions and in quantities insufficient to cause the solution to drip from the fruit, whereby a substantially dry protective deposit of waxy material is quickly formed upon the fruit upon evaporation of the solvent.

3. A process of treating fruit, comprising forming a solution of waxy material in a volatile organic solvent distilling mainly below about 350° F., then atomizing said solution and impinging the atomized particles against the surface of the fruit under conditions and in quantities insufficient to cause the solution to drip from the fruit, and retaining the waxy material substantially as so deposited until evaporation of such solvent.

4. A process of treating fruit, comprising forming a solution of waxy material in a volatile organic solvent distilling mainly below about 350° F., then atomizing said solution and impinging the atomized particles against the surface of the fruit under conditions and in quantities insufficient to cause said solution to drip from the fruit, while turning the fruit to permit scattering of the particles over the surface of the fruit, and retaining the particles substantially as so impinged against the fruit until evaporation of such solvent.

5. A method of treating fresh fruit, which comprises atomizing a solution of a waxy treating material in a volatile organic solvent in a closed chamber, passing the fruit through said chamber, and forcing a current of air through said chamber and over the fruit to cause the atomized particles of said solution to impinge against the fruit and to accelerate evaporation of the solvent from said solution.

6. A method of treating fresh fruit, which comprises atomizing a solution of a waxy treating material in a volatile organic solvent in a closed chamber, passing the fruit through said chamber, and forcing a current of air through said chamber and over the fruit to cause the atomized particles of said solution to impinge against the fruit and to accelerate evaporation of the solvent from said solution, said current of air being of sufficient quantity to prevent the formation of an explosive mixture within said closed chamber.

7. A method of treating fresh fruit, which comprises atomizing a solution of a waxy treating material in a volatile organic solvent in a closed chamber, passing the fruit through said chamber, and forcing a current of air through said chamber and over the fruit to cause the atomized particles of said solution to impinge against the fruit and to accelerate evaporation of the solvent from said solution, the impingement of said atomized particles against the fruit being conducted under conditions and in quantities insufficient to cause dripping of the solution from the fruit.

8. A method of treating fresh fruit, which comprises passing the fruit through a closed chamber, creating a current of air through said chamber and over the fruit, and atomizing a solution of waxy treating material in a volatile organic solvent into said air current to cause the atomized particles to be impinged against the fruit.

9. A method of treating fresh fruit, which comprises passing the fruit through a closed chamber, creating a current of air through said chamber and over the fruit, atomizing a solution of waxy treating material in a volatile organic solvent into said air current to cause the atomized particles to be impinged against the fruit, and controlling the quantity of such solution so impinged against the fruit as to avoid burning of the fruit.

10. A method of treating fresh citrus fruit, which comprises conveying said fruit along a given path, atomizing a solution of waxy treating material in a volatile organic solvent adjacent said path, and drawing the atomized particles of said solution through said path by causing a differential in pressures on opposite sides thereof thereby applying said particles to said fruit.

11. A method of treating fresh citrus fruit, which comprises conveying said fruit along a given path, atomizing a solution of waxy treating material in a volatile organic solvent adjacent said path, drawing the atomized particles of said solution through said path by causing a differential in pressures on opposite sides thereof thereby applying said particles to said fruit, and rotating the fruit while the latter is being so conveyed.

12. A method of treating fresh fruit which comprises, forming a solution of waxy material in a volatile organic solvent capable of burning the surface of said fruit when deposited thereon in excess quantity, said solvent being sufficiently volatile to evaporate from the fruit before its cutting action on the skin of the fruit can result in burning of said skin when an insufficient quantity thereof to produce burning is applied to said fruit; atomizing said solution onto said fruit in quantities sufficient to form a protective wax deposit but insufficient to cause burning of the fruit by the solvent; and allowing the solvent of the solution to evaporate without substantially disturbing the deposited solution during the evaporation of the solvent.

13. A method of treating fresh fruit, which comprises forming a mixture of waxy material and a readily volatile organic solvent, said solvent being capable of burning the surface of said fruit when deposited thereon in excess quantity, the proportions of said waxy material and solvent being such that sufficient waxy material to form a protective deposit may be applied to the fruit without depositing sufficient solvent on said fruit to produce a cutting action on the skin of the fruit such as would result in burning the fruit before said solvent could evaporate, atomizing said mixture onto said fruit in quantity sufficient to form a protective waxy deposit, but insufficient to cause burning of the fruit by the solvent, and allowing the solvent to evaporate without substantially disturbing the deposited mixture during the evaporation of the solvent.

14. A method of treating fresh fruit, which comprises forming a mixture of waxy material and a volatile organic solvent, said solvent having an initial boiling point of about 100° F. and being capable of burning the surface of said fruit when deposited thereon in excess quantity, the proportions of said waxy material and solvent being such that sufficient waxy material to form a protective deposit may be applied to the fruit without depositing sufficient solvent on said fruit to produce a cutting action on the skin of the fruit such as would result in burning the fruit before the solvent could evaporate, atomizing said mixture onto said fruit in quantities sufficient to form a protective waxy deposit, but insufficient to cause burning of the fruit by the solvent, and allowing the solvent to evaporate without brushing the deposited mixture during the evaporation of the solvent.

JAGAN N. SHARMA.